(12) United States Patent
Lai et al.

(10) Patent No.: US 6,670,454 B2
(45) Date of Patent: Dec. 30, 2003

(54) METHOD FOR CROSSLINKING POROUS BIODEGRADABLE POLYMERS

(75) Inventors: Huey-Min Lai, Hsinchu (TW); Kuang-Rong Lee, Hsinchu (TW); Chin-Chin Tsai, Taichung (TW); Hsi-Hsin Shih, Taichung (TW); Yuan-Chia Chang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 195 days.

(21) Appl. No.: 10/000,654

(22) Filed: Nov. 1, 2001

(65) Prior Publication Data

US 2003/0153638 A1 Aug. 14, 2003

(30) Foreign Application Priority Data

Aug. 16, 2001 (TW) ....................................... 90120067 A

(51) Int. Cl.⁷ .................................................. C07K 1/00
(52) U.S. Cl. ...................... 530/402; 424/484; 424/485; 424/486; 424/488; 521/84.1; 530/427; 536/124
(58) Field of Search .......................... 521/84.1; 530/402, 530/427; 536/124; 424/484, 485, 486, 488

(56) References Cited

U.S. PATENT DOCUMENTS

2003/0064156 A1 * 4/2003 Shih et al.
2003/0078672 A1 * 4/2003 Shapiro et al.

* cited by examiner

Primary Examiner—Morton Foelak
(74) Attorney, Agent, or Firm—Darby & Darby

(57) ABSTRACT

The present invention relates to crosslinking of porous materials made of biodegradable polymers. The method comprises: (a) placing a porous biodegradable polymer in a chamber; (b) introducing a supercritical fluid containing a crosslinking agent into the chamber to effect crosslinking of the porous biodegradable polymer; and optionally (c) introducing a pure supercritical into the chamber to wash the crosslinked polymer until the crosslinking agent is substantially removed from the polymer.

22 Claims, 5 Drawing Sheets

METHOD FOR CROSSLINKING POROUS BIODEGRADABLE POLYMERS

BACKGROUND OF THE INVENTION

1. Field of the Invention

The present invention relates in general to the preparation of porous biodegradable polymers, and in particular to a method for making crosslinked porous biodegradable polymers.

2. Description of the Related Arts

Porous biodegradable polymers are useful in a variety of pharmaceutical applications, such as physiological repair and reconstruction, for surgical sutures and internal bone fixation, for burn wound coverings, and for drug delivery systems. The biodegradable polymer itself, as it disintegrates in vivo, will be gradually replaced by the new tissue. The time required for the degradation of the biodegradable polymer is related to the degree of crosslinking. The biological degradation takes place at a slower rate as the degree of crosslinking increases. By varying the degree of crosslinking it is possible to adjust the biological degradation rate in a targeted manner for wound closure, vascular grafts, surgical meshes, surgical implants, composite bone plates, drug control release devices or tissue engineering.

Several techniques have been used to fabricate polymers into porous matrices, including freeze-drying, critical point drying, and air drying. The porous polymer thus obtained is subjected to crosslinking to increase the mechanical properties and the degradation time. The crosslinking techniques for biodegradable polymers can be divided into two categories, physical techniques and chemical techniques. The physical techniques include the thermo-dehydration and UV or γ-ray radiation, which have found limited use due to non-uniform or insufficient crosslinking.

The chemical techniques include liquid phase crosslinking and gas phase crosslinking. In liquid phase crosslinking, the polymer is immersed in a solution of a crosslinking agent over a specified period of time. The crosslinked polymer is recovered, washed with solvent to remove any unreacted crosslinking agent, and then freeze-dried. In vapor phase crosslinking, the polymer is placed above the solution of a crosslinking agent, and the reaction is performed under the vapor of the crosslinking agent by heating the solution. The crosslinked polymer is flushed with air flow to remove unreacted crosslinking agent.

One important drawback of the liquid phase crosslinking is that the pore structure often changes or even collapses during freeze-drying, thus increasing the difficulty of controlling the pore morphology. As to the vapor phase crosslinking, the degrees of crosslinking are not uniform over the polymer matrix, and more worse, the crosslinking agent often remains in the polymer after processing. Residue of crosslinking agent may damage transplanted cells and nearby tissue and deactivate many biologically active factors that one might wish to incorporate into the polymer matrix. For example, glutaraldehyde, the most commonly used crosslinking agent, has been found to be cytotoxic and may cause local tissue calcification.

From the above, it is apparent that an improved method for crosslinking porous biodegradable polymers which can eliminate the problems of the conventional techniques is highly desirable.

SUMMARY OF THE INVENTION

A first object of the invention to provide a method for crosslinking porous biodegradable polymers that substantially obviates the above-mentioned problems.

A second object of the invention is to provide a method for crosslinking porous biodegradable polymers, by which the destruction of pore structures can be avoided.

A third object of the invention is to provide a method for crosslinking porous biodegradable polymers, by which the polymer matrix is uniformly crosslinked.

A fourth object of the invention is to provide a method for crosslinking porous biodegradable polymers that assures complete removal of any unreacted crosslinking agents.

A fifth object of the invention is to provide a method for crosslinking porous biodegradable polymers which can use any crosslinking agent without regard to its vapor pressure.

A sixth object of the invention is to provide a method of crosslinking porous biodegradable polymers which is relatively simple, rapid, and easily tailorable.

To achieve the above objects, the present invention is characterized by the use of supercritical fluids to proceed crosslinking of polymers, and subsequently remove unreacted crosslinking agent. The method according to the invention comprises the steps of: (a) placing a porous biodegradable polymer in a chamber; (b) introducing a supercritical fluid containing a crosslinking agent into the chamber to effect crosslinking of the porous biodegradable polymer; and optionally (c) introducing a pure supercritical fluid into the chamber to wash the crosslinked polymer until the crosslinking agent is substantially removed from the polymer.

By this method, the problems of insufficient or non-uniform crosslinking and incomplete removal of crosslinking agent are eliminated. Additionally, this method is simple, rapid and results in no structural changes of the pore structure. Furthermore, different degrees of crosslinking can be regulated by the operating parameters.

BRIEF DESCRIPTION OF THE DRAWINGS

The above and other objects, features, and advantages of the present invention will become apparent from the following detailed description of preferred embodiments of the invention explained with reference to the accompanying drawings, in which.

REFERENCE NUMERALS IN THE DRAWINGS

| | |
|---|---|
| 1 $CO_2$ cylinder | 2 regulator |
| 3 pump | 4 back pressure regulator |
| 5 metering valve | 6-1 to 6-4 three-way valves |
| 7 crosslinking agent tank | 8 high pressure chamber |
| 9 constant temperature bath | 10 gas flow meter |

DETAILED DESCRIPTION OF THE INVENTION

Supercritical fluid refers here to a gas or liquid above its critical point. At the critical point, physical properties of the liquid and gaseous states, in particular the densities, are identical. The temperature and pressure values at the critical point may be termed the critical conditions and are constant for a given fluid. Any supercritical fluid, including carbon dioxide, ammonia, noble gases (e.g., argon), refrigerant, lower hydrocarbons (hydrocarbons that contain 1 to 8 carbon atoms, e.g., propane), and nitrogen may be used in the method of the present invention. Carbon dioxide ($CO_2$), at a pressure of at least 7376 kPa and a temperature of at least 31.1° C., is a preferred example.

Figure 1:
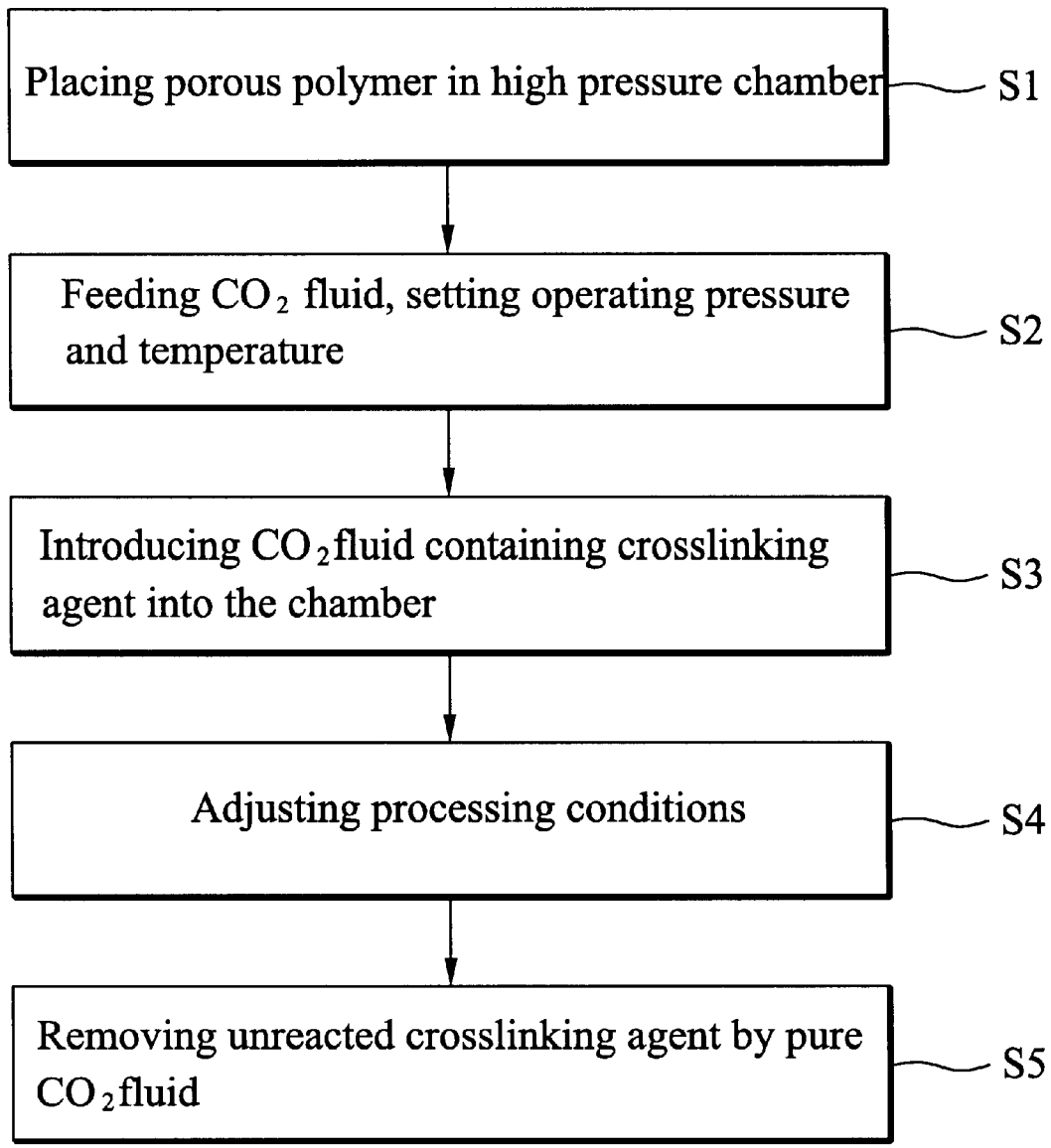
FIG. 1 is a flow chart showing the process steps of the crosslinking method of the invention.
Figure 2:
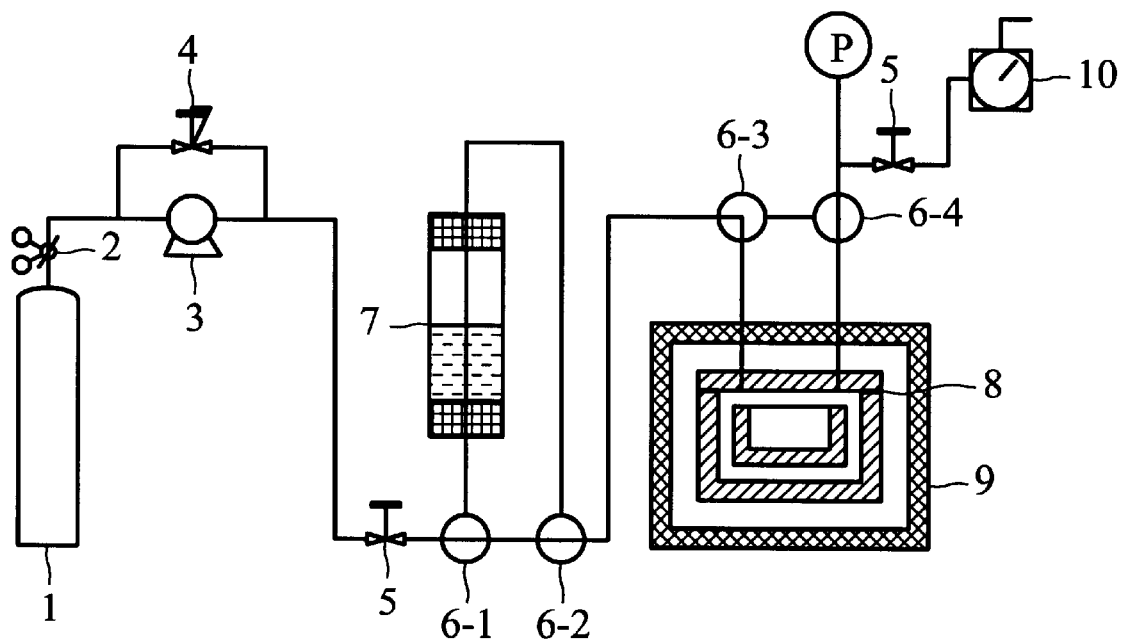
FIG. 2 illustrates representative equipment used in the examples of the invention.

The invention is described in more detail by referring to the flow chart of FIG. 1 and the representative equipment of FIG. 2. First, a porous biodegradable polymer is loaded in high pressure chamber 8 (S1). Then, carbon dioxide from cylinder 1 is fed into high pressure chamber 8 through high pressure pump 3, and heated above its critical temperature in the chamber 8 (S2). When the pressure and the flow rate of carbon dioxide reach the predetermined values, three-way valves 6-1, 6-2 are switched such that the carbon dioxide flows into tank 7 which has been loaded with a crosslinking agent. After about 1 to 2 hours passed, three-way valves 6-3, 6-4 are switched such that the carbon dioxide carries the crosslinking agent into high pressure chamber 8 to proceed crosslinking reaction (S3). The degree of crosslinking can be controlled by adjusting the processing conditions such as the flow rate, the concentration of the crosslinking agent, and the operating temperature (S4). Once the process is complete, pure carbon dioxide is fed into chamber 8 by switching back three-way valves 6-1, 6-2 to drive out any unreacted crosslinking agent (S5). Thereafter, the pressure in high pressure chamber 8 is released, and a crosslinked porous biodegradable polymer is obtained.

The method of the present invention is particularly suited to the crosslinking of biodegradable polymers. Suitable biodegradable polymers include proteins such as collagen, gelatin, or any other animal or plant proteins; polysaccharides such as hyaluronic acid, chitin, chitosan, and the like; synthetic polymers such as polyvinyl alcohol (PVA), polyglycolic acid (PGA), polylactic acid (PLA), poly(glycolic-co-lactic acid) (PLGA), or polycaprolactone (PCL). A mixture or copolymer of the above is also suitable for use. As well, the present method can be used for crosslinking of other ordinary polymers.

The pore morphology of the biodegradable porous polymer to be used herein is not specifically limited. The polymer may comprise (predominately) closed pores, interconnected pores, or a mixture of both. The pore diameter may be in the range of 0.01 to 500 $\mu$m, and the porosity may be in the range of 0.05 to 0.99.

Crosslinking agents which are well-known for use in crosslinking of biodegradable polymers include formaldehyde, glutaraldehyde, dialdehyde starch, and epoxides. The most commonly used crosslinking agent is glutaraldehyde. According to the present invention, because the crosslinking agent is brought into contact with the polymer by a supercritical fluid rather than by its vapor, any suitable crosslinking agent may be used regardless of its vapor pressure. Therefore, besides the above-mentioned crosslinking agents, carbodiimides, isocyanates, metallic cross-linkers, ionic cross-linkers, heterocyclic compounds (e.g., genipin), and acrylic derivatives may also be used successfully.

To increase the solubility of crosslinking agents in supercritical fluid, the supercritical fluid may pass through a co-solvent tank before entering the crosslinking agent tank 7. A co-solvent is a mixture of two or more miscible liquids such as alcohols and water-miscible liquids.

A main feature of this invention is that the degree of crosslinking of the biodegradable polymer can be tailored to the specific end use by altering the reaction time, the concentration of the crosslinking agent, the flow rate, the operating temperature or pressure. The concentration of the crosslinking agent is not specifically limited, but should be sufficient to effect the crosslinking reaction. The pressure inside the chamber is at least 1 atmosphere, and the operating temperature is generally in the range of about 20° to 150° C., and preferably about 20° to 50° C. The flow rate of the supercritical fluid is generally in the range of about 0.1 to 10 L/min. The reaction time is at least one minute, and usually in the range of about 30 minutes to 8 hours.

Another feature of this invention is that the unreacted crosslinking agent is readily removed from the polymer by the subsequently introduced pure supercritical fluid. The supercritical fluid used in this step may be the same or different with the supercritical fluid used to carry the crosslinking agent. This washing step is allowed to continue until as much of the crosslinking agent as possible is removed from the polymer. Incomplete removal of the crosslinking agent may cause cytotoxicity problems.

The crosslinked porous polymers obtained in accordance with the present invention may be fabricated into useful articles for tissue engineering and regeneration applications, including reconstructive surgery. The polymers may also be used to form external scaffolding for the support of in vitro culturing of cells for the creation of external support organs. The polymers are also useful in controlled-release drug delivery systems.

In view of the foregoing, it is readily appreciated that the present invention provides a relatively simple crosslinking method by using supercritical fluid techniques. With the present invention, the problems of pore destruction, non-uniform crosslinking, and incomplete removal of crosslinking agent are eliminated. In addition, because the crosslinking and the washing processes are performed under the same operating system, this method is relatively simple and efficient as opposed to conventional techniques. Furthermore, different degrees of crosslinking can be regulated by the operating parameters.

Without intending to limit it in any manner, the present invention will be further illustrated by the following examples.

Preparative Example

Preparation of Porous Biodegradable Polymer

Figure 3:
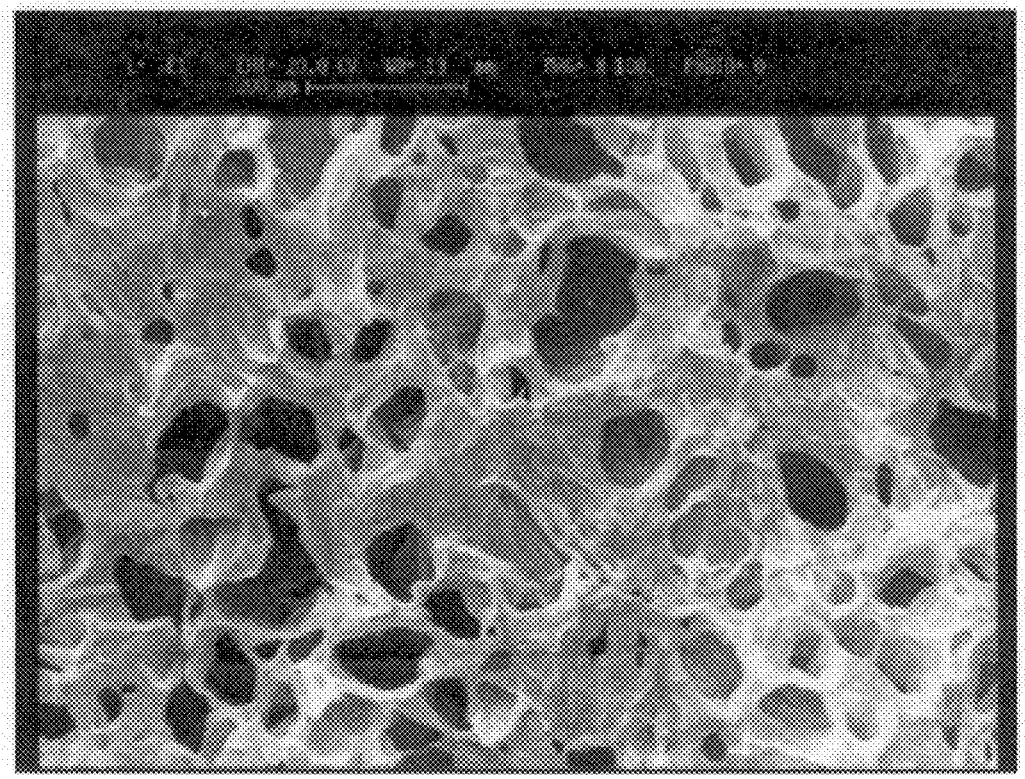
FIG. 3 is a scanning electron micrograph (SEM) of a sample from Example 1, which shows open cell morphology.

A solution of 1 wt % gelatin in deionized water was thoroughly agitated and then placed in a freeze-drying apparatus. The solution was freeze-dried under 100 millitorr at −80° C. for 24 hours for complete sublimation of the solvent, leaving a porous matrix with a porosity of above 99%. The porosity (P) of the material is calculated using the following equation:

$$P=[1-(D1/D2)]\times 100$$

in which D1 is the apparent density of the product and D2 is the true density, measured using an MP-200S electric dencimeter. The pore morphology and pore size were determined using scanning electron microscopy (SEM). The SEM photograph of FIG. 3 reveals an open-pore structure with pore size between about 50 to 200 μm.

EXAMPLE 1

Crosslinking of Porous Biodegradable Polymer

The porous polymer obtained in Example 1 was placed in a high pressure chamber. $CO_2$ was taken from a cylinder, passed through a crosslinking agent tank containing glutaraldehyde, and loaded into the high pressure chamber. The $CO_2$ was applied at 1,000 psi with a flow rate of 1 L/min. The crosslinking reaction proceeded for 1 hours and the temperature was kept at 30° C. during the reaction. After this, a pure $CO_2$ was charged into the chamber under 3,000 psi for 1 hour to remove unreacted glutaraldehyde.

EXAMPLE 2

Crosslinking of Porous Biodegradable Polymer

The same procedure outlined in Example 1 was repeated except that the pure $CO_2$ was applied for 3 hours after the crosslinking reaction.

Figure 4:
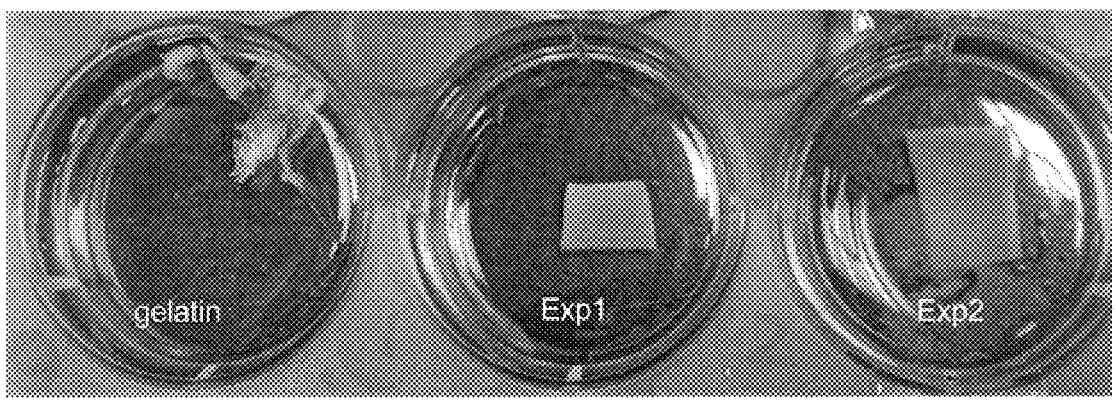
FIGS. 4–6 are a series of photographs, in which FIG. 4 was taken soon after non-crosslinked gelatin and the crosslinked gelatins from Examples 1–2 were placed in a PBS solution, and FIG. 5 and FIG. 6 were taken after 2 minutes and 51 days passed, respectively.
Figure 5:
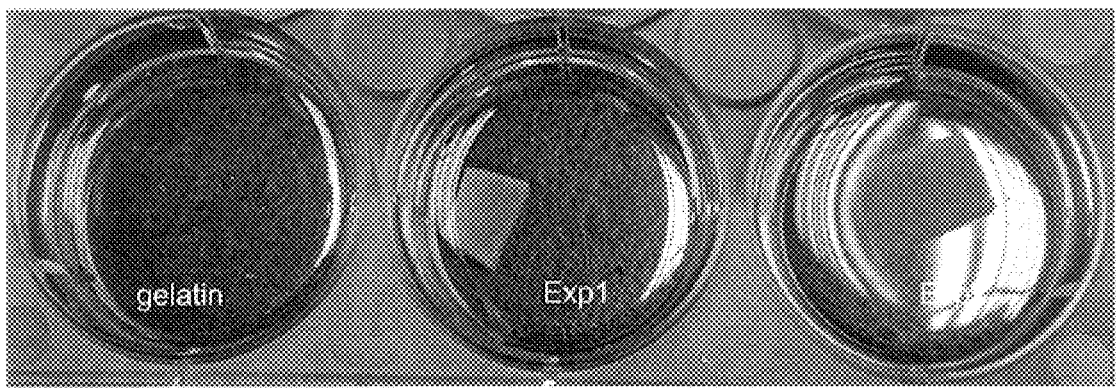
Figure 6:
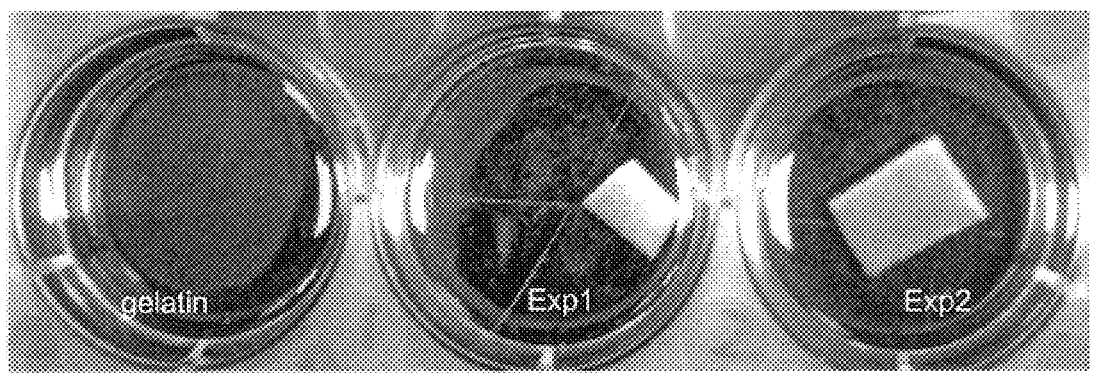

The gelatins from Preparative Example and Examples 1–2 were immersed in a phosphate buffer solution (PBS) for observation (FIG. 4). The porous structure of the gelatin from Preparative Example was collapsed and dissolved within 2 minutes (FIG. 5). By contrast, the porous structures of the crosslinked gelatins from Examples 1–2 were preserved even after 51 days (FIG. 6), indicating that the crosslinking was sufficient and uniform.

EXAMPLE 3

Swelling Test

Figure 7:
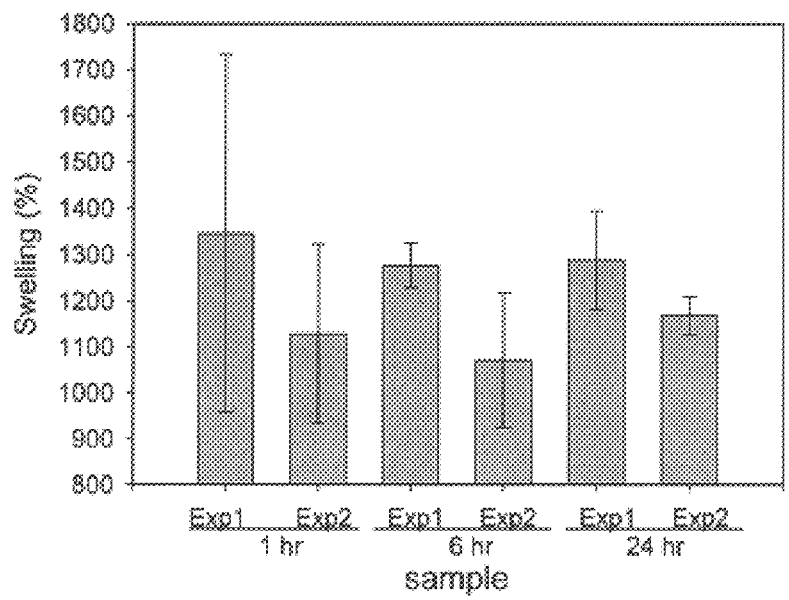
FIG. 7 shows the results of the swelling test.

The samples from Examples 1–2 were cut into 1 cm×1.3 cm specimens and dried in a 30° C. oven for at least 3 hours. Each of the dried samples was weighed and then swollen in a phosphate buffer solution of the same weight (about 8 ml). The swollen samples were taken out and measured for their weights and surface areas after a period of 1, 6, and 24 hours respectively. Then, the samples were placed in an oven and dried at 30° C. overnight. The dried samples were measured for their weights, and the swelling ratio was calculated using the following equation:

$$\text{Swelling ratio}=(Ww-Wd)/Wd\times 100\%$$

where Ww and Wd are the weights of swollen polymer and dried polymer, respectively. The swelling ratio gives a measure of crosslinking in the polymer. As shown in FIG. 7, the swelling ratios of the samples from Examples 1–2 were 13 and 11, respectively, and no dissociation was observed. These suggest the gelatins had a high degree of crosslinking.

EXAMPLE 4

Degradation Test

Figure 8:
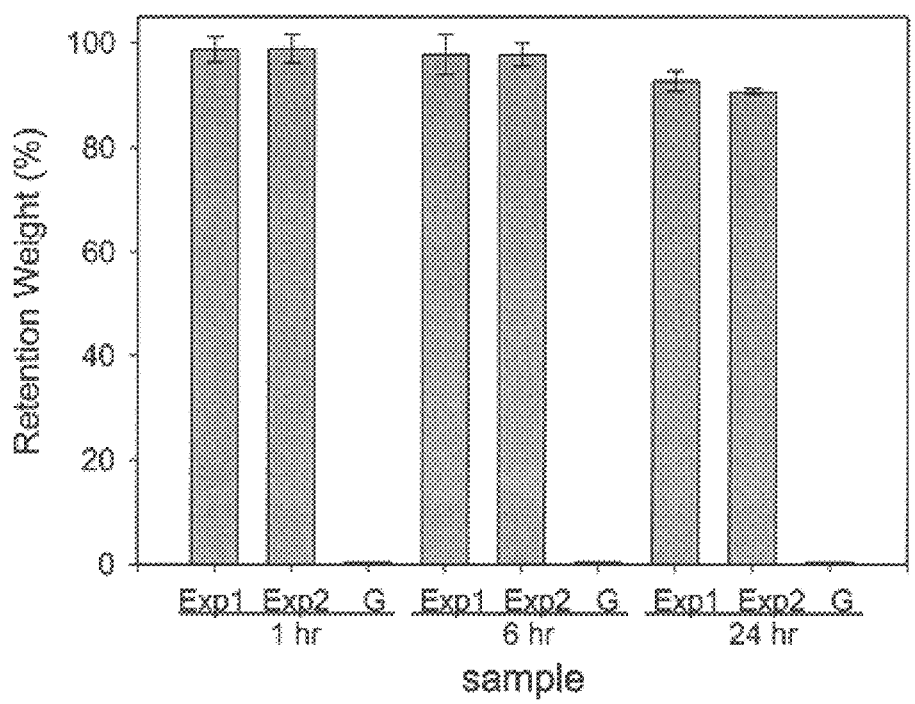
FIG. 8 shows the results of the degradation test.

The samples from Examples 1–2 were cut into 1 cm×1.3 cm specimens and dried in an oven at 30° C. for at least 3 hours. The dried samples were weighed and then swollen in a phosphate buffer solution of the same weights (about 8 ml). The swollen samples were taken out and measured for their weights and surface areas after a period of 1, 6, and 24 hours respectively. After this, the samples were placed in an oven and dried at 30° samples were measured for their weights, and the retention weight percentage was calculated using the following equation:

$$\text{Retention weight}\%=100-((Wd1-Wd2)/Wd1\times 100\%)$$

where Wd1 and Wd2 are the weights of dried polymer and dried swollen polymer, respectively. As shown in FIG. 8, the retention weight percentages were 98% after 6 hours, and 90% after 24 hours, respectively.

EXAMPLE 4

Cytotoxicity Test

Cytotoxicity is measured by the method described in ASTM F-895 "Standard Test Method for Agar Diffusion Cell Culture for Cytotoxicity". This test method is appropriate for materials in a variety of shapes and for materials that are not necessarily sterile. This test method is appropriate in situations where the amount of material is limited. For example, small devices or powders can be placed on the agar and the presence of a zone of inhibition of cell growth can be observed.

Cells were introduced into a laboratory dish together with a culture fluid and cultured for 24 hours in a 37° C carbon dioxide incubator. After cleaning with a buffer liquid, the cell layer was covered with a culture solution to which agar had been added, and then left for 20 minutes to 30 minutes to turn out a gel. After dyeing with Neutral Red, the excess dye was removed. The substance to be tested was put on the agar gel, and the dish was turned upside down and cultured for 24 hours in the carbon dioxide incubator. The distances between the end of the substance and decolored cells were measured to determine zone indices. The distances between the end of the substance and non-destroyed cells were measured and used as lysis indices. The degree of injury to the cells was estimated on the basis of the two index values (0 through 5). A result of 0/0 (Zone index/Lysis index) indicates that the test specimen shows no cytotoxicity response.

TABLE 1

| Sample | Response index (zone index/lysis index) |
| --- | --- |
| Negative control (Latex Rubber) | 4/4 |
| Positive control (Teflon) | 0/0 |
| Gelatin | 0/0 |
| Example 1 | 2/3 |
| Example 2 | 1D/2 |

As shown in Table 1, the sample from Example 2 exhibited lower cytotoxicity as compared to the sample from Example 1, indicating that the crosslinking agent can be taken by the supercritical $CO_2$ wash.

While the invention has been particularly shown and described with reference to the preferred embodiment thereof, it will be understood by those skilled in the art that various changes in form and details may be made without departing from the spirit and scope of the invention.

What is claimed is:

1. A method for crosslinking a porous biodegradable polymer, comprising the steps of:

(a) placing a porous biodegradable polymer in a chamber; and (b) introducing a supercritical fluid containing a crosslinking agent into the chamber to effect crosslinking of the porous biodegradable polymer.

2. The method as claimed in claim 1, wherein the porous biodegradable polymer is selected from the group consisting of proteins, polysaccharides, synthetic materials, and mixtures or copolymers thereof.

3. The method as claimed in claim 1, wherein the porous biodegradable polymer comprises predominately interconnected pores.

4. The method as claimed in claim 1, wherein the porous biodegradable polymer comprises predominately closed pores.

5. The method as claimed in claim 1, wherein the porous biodegradable polymer comprises both closed pores and interconnected pores.

6. The method as claimed in claim 1, wherein the supercritical fluid is selected from the group consisting of carbon dioxide, nitrogen, noble gases, refrigerant, lower hydrocarbons, and mixtures thereof.

7. The method as claimed in claim 1, wherein the crosslinking agent is selected from the group consisting of aldehydes, epoxides, carbodiimides, isocyanates, metallic cross-linkers, ionic cross-linkers, heterocyclic compounds, acrylic derivatives, and mixtures thereof.

8. The method as claimed in claim 1, wherein the supercritical fluid further contains a co-solvent.

9. The method as claimed in claim 1, which further comprises, after step (b), (c) introducing a pure supercritical fluid into the chamber to wash the crosslinked polymer.

10. The method as claimed in claim 9, wherein the supercritical fluid in step (b) and the supercritical fluid in step (c) are independently the same or different, selected from the group consisting of carbon dioxide, nitrogen, noble gases, refrigerant, lower hydrocarbons, and mixtures thereof.

11. The method as claimed in claim 9, wherein step (c) is continued until the crosslinking agent is substantially removed from the polymer.

12. A method for crosslinking a porous biodegradable polymer, comprising the steps of:

(a) placing a porous biodegradable polymer in a chamber;

(b) introducing a supercritical carbon dioxide fluid containing a crosslinking agent into the chamber to effect crosslinking of the porous biodegradable polymer; and (c) introducing a pure supercritical carbon dioxide fluid into the chamber to wash the crosslinked polymer until the crosslinking agent is substantially removed from the polymer.

13. The method as claimed in claim 12, wherein the porous biodegradable polymer is selected from the group consisting of proteins, polysaccharides, synthetic materials, and mixtures or copolymers thereof.

14. The method as claimed in claim 12, wherein the porous biodegradable polymer comprises predominately interconnected pores.

15. The method as claimed in claim 12, wherein the porous biodegradable polymer comprises predominately closed pores.

16. The method as claimed in claim 12, wherein the porous biodegradable polymer comprises both closed pores and interconnected pores.

17. The method as claimed in claim 12, wherein the crosslinking agent is selected from the group consisting of aldehydes, epoxides, carbodiimides, isocyanates, metallic cross-linkers, ionic cross-linkers, heterocyclic compounds, acrylic derivatives, and mixtures thereof.

18. The method as claimed in claim 12, wherein the supercritical carbon dioxide fluid in step (b) further contains a co-solvent.

19. The method as claimed in claim 12, wherein in step (b) the supercritical carbon dioxide fluid is introduced at a flow rate between about 0.1 to 10 L/min.

20. The method as claimed in claim 12, wherein in step (b) the supercritical carbon dioxide fluid is applied for at least one minute.

21. The method as claimed in claim 12, wherein in step (b) the chamber is maintained at a temperature between 20° to 150° C.

22. The method as claimed in claim 12, wherein in step (b) the chamber is maintained at a pressure above 1 atmosphere.

* * * * *